(12) United States Patent
Tang et al.

(10) Patent No.: US 10,122,087 B2
(45) Date of Patent: Nov. 6, 2018

(54) PROXIMITY SENSOR ANTENNA DEVICE AND ANTENNA STRUCTURE THEREOF

(71) Applicant: AUDEN TECHNO CORP., Taoyuan County (TW)

(72) Inventors: Chia-Lun Tang, Miaoli County (TW); Chi-Ming Chiang, Taoyuan County (TW); Chun-Chuan Chang, Keelung (TW)

(73) Assignee: AUDEN TECHNO CORP., Taoyuan County (TW)

( * ) Notice: Subject to any disclaimer, the term of this patent is extended or adjusted under 35 U.S.C. 154(b) by 93 days.

(21) Appl. No.: 15/433,132

(22) Filed: Feb. 15, 2017

(65) Prior Publication Data

US 2018/0233822 A1    Aug. 16, 2018

(51) Int. Cl.

| | |
|---|---|
| *H01Q 1/38* | (2006.01) |
| *H01Q 5/328* | (2015.01) |
| *H01Q 1/22* | (2006.01) |
| *H01Q 1/48* | (2006.01) |

(52) U.S. Cl.
CPC ........... *H01Q 5/328* (2015.01); *H01Q 1/2291* (2013.01); *H01Q 1/48* (2013.01)

(58) Field of Classification Search
CPC ......... H01Q 5/328; H01Q 1/2291; H01Q 1/48
See application file for complete search history.

(56) References Cited

U.S. PATENT DOCUMENTS

| | | | | |
|---|---|---|---|---|
| 2013/0310106 A1* | 11/2013 | Wang | ................... | H03K 17/955 455/550.1 |
| 2015/0022403 A1* | 1/2015 | Lin | ........................ | H01Q 1/243 343/702 |
| 2015/0200447 A1* | 7/2015 | Tang | ...................... | H01Q 1/243 343/720 |
| 2016/0226143 A1* | 8/2016 | Chen | ......................... | H01Q 5/10 |
| 2017/0160416 A1* | 6/2017 | Juan | .......................... | G01V 3/08 |

* cited by examiner

*Primary Examiner* — Jessica Han
*Assistant Examiner* — Jae Kim
(74) *Attorney, Agent, or Firm* — Li & Cai Intellectual Property (USA) Office

(57) ABSTRACT

An antenna structure includes a first conductor, a high-frequency blocking unit, and a second conductor. The first conductor includes a feeding segment, a coupling segment spaced apart from the feeding segment, and a DC blocking unit connected between the feeding segment and the coupling segment. The high-frequency blocking unit is connected to the coupling segment. The second conductor is spaced apart from the first conductor and couples with the coupling segment. An end of the second conductor is connected to a ground, and the second conductor is provided without connecting any capacitance member and any inductance member. The coupling segment is used as a capacitor electrode for detecting an external object. When the coupling segment is in a capacitor electrode mode, a capacitance value between the coupling segment and the external object is variable according to a distance between the coupling segment and the external object.

10 Claims, 6 Drawing Sheets

PROXIMITY SENSOR ANTENNA DEVICE AND ANTENNA STRUCTURE THEREOF

BACKGROUND OF THE INVENTION

1. Field of the Invention

The present disclosure relates to an antenna device; in particular, to a proximity sensor (P-sensor) antenna device and an antenna structure thereof.

2. Description of Related Art

For controlling radiation intensity generated by a hand-held electronic device to a user, a P-sensor is added to an antenna, which is applied to wireless wide area network (WWAN), in a hand-held electronic device for detecting a distance between the user and the antenna. A protection mechanism can be started by using the P-sensor to reduce radiation of the antenna, thereby decreasing the radiation intensity generated by the hand-held electronic device to the user.

Please refer to FIG. 1, which shows a conventional antenna structure 1a. The conventional antenna structure 1a has a radiating portion 11a connected to a ground, and the radiating portion 11a can be used as a capacitance electrode of a P-sensor 2a by connecting to at least one capacitor 12a. In other words, the conventional antenna structure 1a must be provided with the capacitor 12a connecting the radiating portion 11a to the ground, obviously causing the development of antenna structure to be restricted.

SUMMARY OF THE INVENTION

The present disclosure provides a proximity sensor antenna device and an antenna structure thereof to solve the problem of conventional antenna devices.

The present disclosure provides a proximity sensor antenna device including an antenna structure and a proximity sensor. The antenna structure includes a first conductor, a high-frequency blocking unit, and a second conductor. The first conductor has a feeding segment for connecting to a signal feeding cable, a coupling segment spaced apart from the feeding segment, and a direct current (DC) blocking unit connected between the feeding segment and the coupling segment. The high-frequency blocking unit is connected to the coupling segment of the first conductor. The second conductor is spaced apart from the first conductor. Moreover, an end of the second conductor is connected to a ground, and the second conductor is provided without connecting any capacitance member and any inductance member. The coupling segment of the first conductor is selectively in a coupling antenna mode and in a capacitance electrode mode. When the coupling segment is in the coupling antenna mode, the coupling segment is configured to couple with the second conductor through a radiofrequency signal. When the coupling segment is in the capacitance electrode mode, the coupling segment is configured to detect an external object, and a capacitance value between the coupling segment and the external object is variable according to a distance between the coupling segment and the external object. The proximity sensor is electrically connected to the high-frequency blocking unit. The proximity sensor is electrically connected to the coupling segment of the first conductor via the high-frequency blocking unit.

The present disclosure also provides an antenna structure of a proximity sensor antenna device. The antenna structure includes a first conductor, a high-frequency blocking unit, and a second conductor. The first conductor has a feeding segment for connecting to a signal feeding cable, a coupling segment spaced apart from the feeding segment, and a direct current (DC) blocking unit connected between the feeding segment and the coupling segment. The high-frequency blocking unit is connected to the coupling segment of the first conductor. The second conductor is spaced apart from the first conductor. Moreover, an end of the second conductor is connected to a ground, and the second conductor is provided without connecting any capacitance member and any inductance member. The coupling segment of the first conductor is selectively in a coupling antenna mode and in a capacitance electrode mode. When the coupling segment is in the coupling antenna mode, the coupling segment is configured to couple with the second conductor through a radiofrequency signal. When the coupling segment is in the capacitance electrode mode, the coupling segment is configured to detect an external object, and a capacitance value between the coupling segment and the external object is variable according to a distance between the coupling segment and the external object.

In summary, the high-frequency blocking segment connected to the P-sensor is connected to the coupling segment of the first conductor, so that the second conductor spaced apart from the first conductor does not need to be a capacitance electrode of the P-sensor and does not need to connect to any capacitance member or any inductance member. Thus, the antenna structure (or the P-sensor antenna device) of the present disclosure has a low producing cost and is different from the conventional antenna structure.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

First Embodiment

Figure 1:
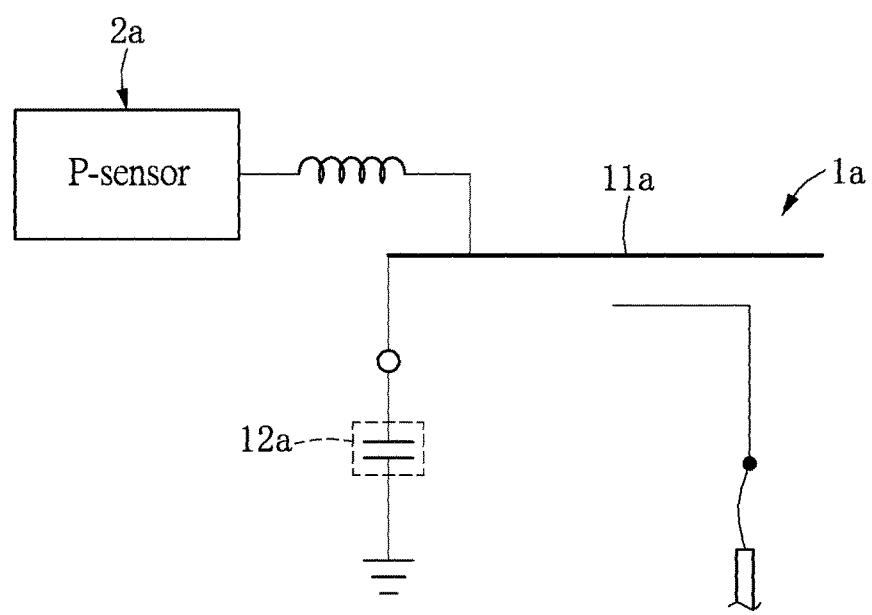
FIG. 1 is a schematic view showing a conventional antenna structure connected to a P-sensor.
Figure 2:
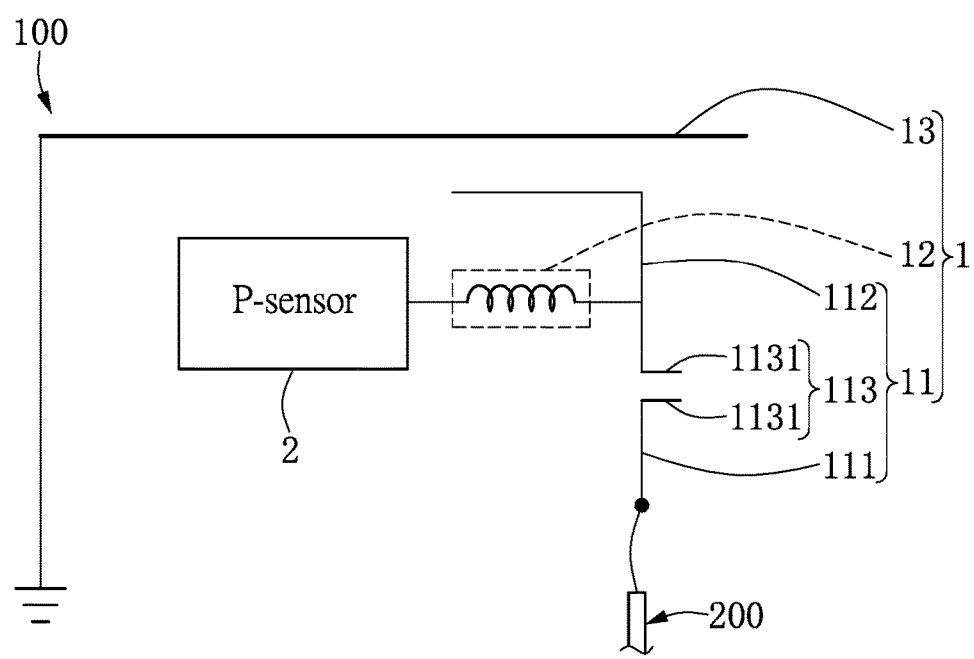
FIG. 2 is a schematic view showing a P-sensor antenna device according to a first embodiment of the present disclosure.
Figure 3:
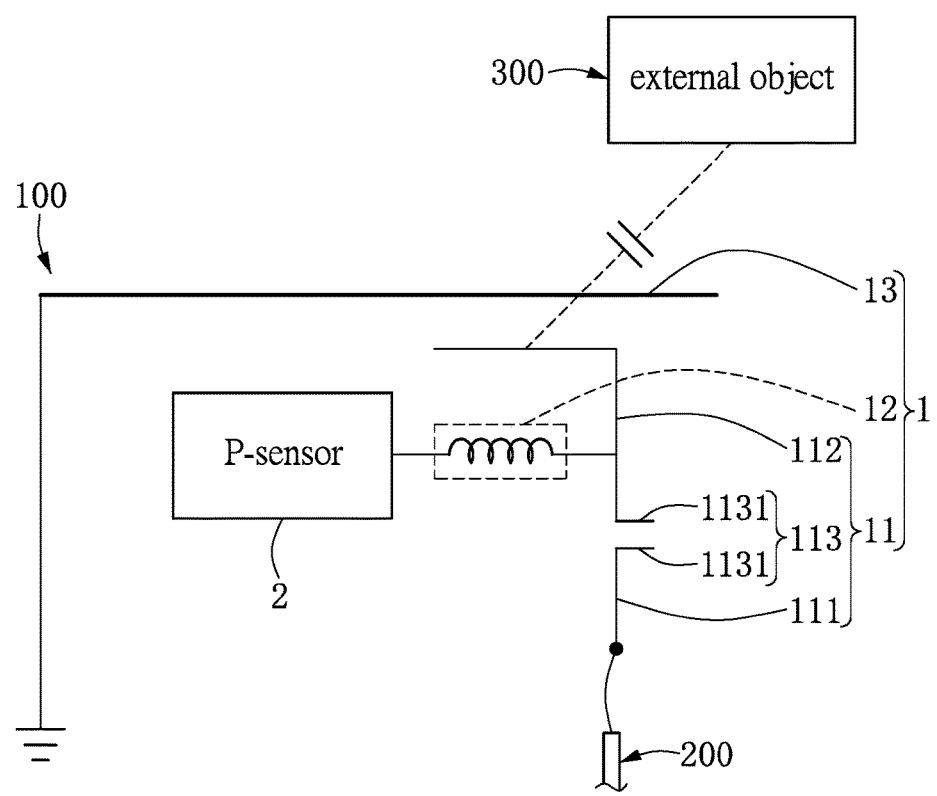
FIG. 3 is an operating view of FIG. 2.
Figure 4:
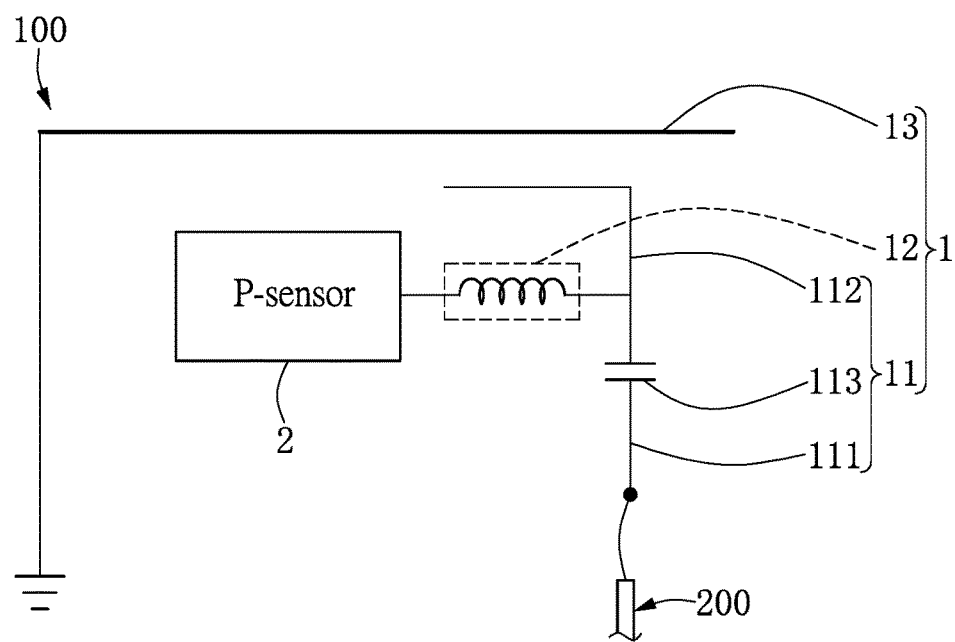
FIG. 4 is a schematic view showing another aspect of the P-sensor antenna device.

Reference is made to FIGS. 2 through 4, which show a first embodiment of the present disclosure. References are hereunder made to the detailed descriptions and appended drawings in connection with the present disclosure. However, the appended drawings are merely provided for exemplary purposes, and should not be construed as restricting the scope of the present disclosure.

As shown in FIGS. 2 and 3, the present embodiment discloses a proximity sensor antenna device (P-sensor antenna device) 100 for installing in an electronic apparatus (not shown), and the P-sensor antenna device 100 is provided to cooperate with a signal feeding cable 200 of the electronic apparatus. The electronic apparatus can be a notebook computer, a tablet computer, a global positioning system (GPS), a hand-held electronic device (i.e., a smart phone), or a wearable apparatus (i.e., a smart watch).

The P-sensor antenna device 100 includes an antenna structure 1 and a proximity sensor module (P-sensor module) 2 electrically connected to the antenna structure 1. The antenna structure 1 has a first conductor 11, a high-frequency blocking unit 12 connected to the first conductor 11, and a second conductor 13.

The first conductor 11 has a feeding segment 111 for inputting signals, a coupling segment 112 spaced apart from the feeding segment 111, and a direct current (DC) blocking unit 113 connected between the feeding segment 111 and the coupling segment 112. The feeding segment 111 is configured to (electrically) connect the signal feeding cable 200, and the coupling segment 112 is electrically connected to the feeding segment 111 via the DC blocking unit 113. Specifically, the DC blocking unit 113 includes two coupling portions 1131 spaced apart from each other. The two coupling portions 1131 are respectively and integrally connected to the feeding segment 111 and the coupling segment 112, and the two coupling portions 1131 are configured to couple with each other to generate a capacitance effect.

The feeding segment 111 and the coupling segment 112 are electrically connected to each other by using the two separately arranged coupling portions 1131 to couple with each other, so that the first conductor 11 can be formed by using a semiconductor process. That is to say, the first conductor 11 can be formed without installing an independent electronic component (e.g., a capacitor) which may affect a radiation effect of the antenna structure 1, so that the production cost of the antenna structure 1 can be reduced.

In addition, the DC blocking unit 113 having the two coupling portions 1131 in the present embodiment is used as an example, and the present disclosure is not limited thereto. As shown in FIG. 4, the DC blocking unit 113 can be a capacitor connected between the feeding segment 111 and the coupling segment 112.

The high-frequency blocking unit 12 is connected to the coupling segment 112 of the first conductor 11, and the high-frequency blocking unit 12 in the present embodiment, such as an inductor, can generate an inductance effect. Moreover, a connection part of the high-frequency blocking unit 12 and the coupling segment 112 is preferably arranged close to the DC blocking unit 113, such that most of the coupling segment 112 can be used as a capacitance electrode. The P-sensor 2 is connected to the high-frequency blocking unit 12, and the P-sensor 2 is electrically connected to the coupling segment 112 of the first conductor 11 via the high-frequency blocking unit 12.

The second conductor 13 is spaced apart from the first conductor 11, and the second conductor 13 can be used to couple with the coupling segment 112 of the first conductor 11 through a radiofrequency (RF) signal. One end of the second conductor 13 is connected to a ground, and the other end of the second conductor 13 is a free end. It should be noted that the second conductor 13 in the present embodiment is not used as a capacitance electrode of the P-sensor 2, so that the second conductor 13 is provided without having to connect to any capacitance member and any inductance member. Thus, the antenna structure 1 of the present embodiment has a low production cost (i.e., the numbers of the capacitance member and the inductance member are reduced) and is different from conventional antenna structures.

Specifically, the coupling segment 112 of the first conductor 11 is selectively in a capacitance electrode mode and in a coupling antenna mode. When the coupling segment 112 is in the capacitance electrode mode, the coupling segment 112 is configured to be an capacitance electrode for detecting an external object 300 (i.e., person), and a capacitance value between the coupling segment 112 and the external object 300 is variable according to a distance between the coupling segment 112 and the external object 300. When the coupling segment 112 is in the coupling antenna mode, the coupling segment 112 is configured to couple with the second conductor 13 through a RF signal.

Moreover, when the coupling segment 112 is in the capacitance electrode mode, the DC blocking unit 113 is substantially identical to an open-circuit, so that a detecting signal received by the coupling segment 112 cannot travel into the feeding segment 111. When the coupling segment 112 is in the coupling antenna mode, the high-frequency blocking unit 12 is substantially identical to an open-circuit, so that the RF signal cannot travel into the P-sensor 2.

Specifically, when a detecting signal travels in the coupling segment 112 of the antenna structure 1, the DC blocking unit 113 has a high impedance (such as an open-circuit) and the high-frequency blocking unit 12 has a low impedance (such as a short-circuit), and thus the coupling segment 112 can be used as a capacitance electrode of the P-sensor 2. When a RF signal emitted from the second conductor 13 travels in the coupling segment 112 of the antenna structure 1, the DC blocking unit 113 has a low impedance (such as a short-circuit) and the high-frequency blocking unit 12 has a high impedance (such as an open-circuit). Thus the high-frequency blocking unit 12 can be used to effectively isolate the P-sensor 2 from the RF signal traveling in the coupling segment 112, and the first conductor 11 and the second conductor 13 are coupled through the RF signal so as to construct a mono-pole antenna.

When the external object 300 is far from the antenna structure 1, a RF transmission function of the electronic apparatus (not shown) including the P-sensor antenna device 100 of the present disclosure is not affected by the P-sensor 2. When the external object 300 is close to the antenna structure 1, the capacitance value between the coupling segment 112 of the first conductor 11 and the external object 300 increases, causing the P-sensor 2 to emit a corresponding signal to the electronic apparatus so as to reduce the radiation of RF signal (e.g., Specific Absorption Rate) generated by the electronic apparatus. Thus, when a user closely operates the electronic apparatus, the near field electromagnetic radiation intensity generated by the electronic apparatus can comply with standards of different countries.

Second Embodiment

Figure 5:
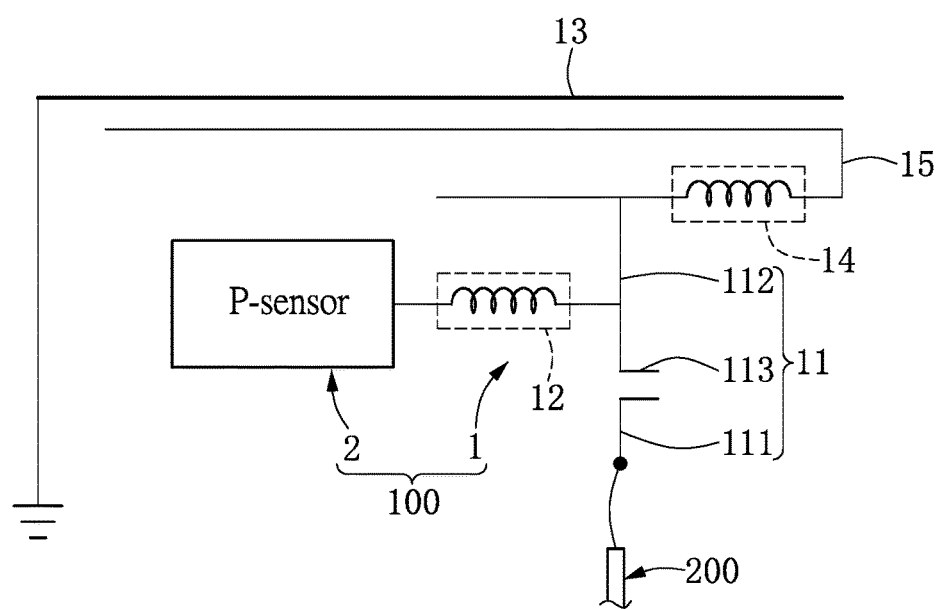
FIG. 5 is a schematic view showing a P-sensor antenna device according to a second embodiment of the present disclosure.

Reference is made to FIG. 5, which shows a second embodiment of the present disclosure. The second embodiment is similar to the first embodiment, and the identical features are not described. The different feature between the two embodiments is that the antenna 1 further includes a first inductance unit 14 and a first expanding electrode segment 15.

Specifically, one end of the first inductance unit 14 is connected to the coupling segment 112 of the first conductor 11, and the other end of the first inductance unit 14 is connected to the first expanding electrode segment 15, so that the coupling segment 112 and the first expanding electrode segment 15 are configured to co-detect the external object 300 when the coupling segment 112 is in the capacitance electrode mode. That is to say, the coupling segment 112 and the first expanding electrode segment 15 are used as a capacitance electrode of the P-sensor 2.

In addition, in other embodiments (not shown) of the present disclosure, the first inductance unit 14 can be connected to an end of the coupling segment 112 arranged away from the feeding segment 111.

Third Embodiment

Figure 6:
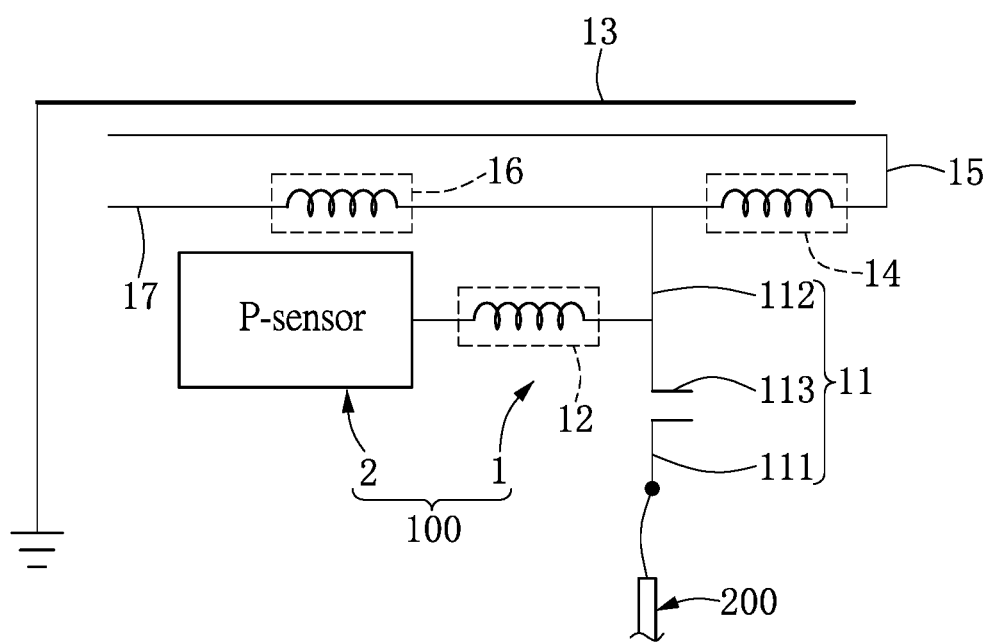
FIG. 6 is a schematic view showing a P-sensor antenna device according to a third embodiment of the present disclosure.

Reference is made to FIG. 6, which shows a third embodiment of the present disclosure. The third embodiment is similar to the second embodiment, and the identical features are not described. The different feature between the two embodiments is that the antenna 1 further includes a second inductance unit 16 and a second expanding electrode segment 17.

Specifically, one end of the second inductance unit 16 is connected to the coupling segment 112 of the first conductor 11, and the other end of the second inductance unit 16 is connected to the second expanding electrode segment 17, so that the coupling segment 112, the first expanding electrode segment 15, and the second expanding electrode segment 17 are configured to co-detect the external object 30 when the coupling segment 112 is in the capacitance electrode mode. That is to say, the coupling segment 112, the first expanding electrode segment 15, and the second expanding electrode segment 17 are used as a capacitance electrode of the P-sensor 2.

Moreover, the second inductance unit 16 is connected to an end of the coupling segment 112 arranged away from the feeding segment 111 (i.e., the left end of the coupling segment 11 as shown in FIG. 6). According to the second and third embodiments of the present disclosure, one of the first inductance member 14 and the second inductance member 16 can be connected to an end of the coupling segment 112 arranged away from the feeding segment 111.

The Effect of the Present Disclosure

In summary, the high-frequency blocking segment connected to the P-sensor is connected to the coupling segment of the first conductor, so that the second conductor spaced apart from the first conductor does not need to be a capacitance electrode of the P-sensor and does not need to connect to any capacitance member or any inductance member. Thus, the antenna structure (or the P-sensor antenna device) of the present disclosure has a low production cost and is different from conventional antenna structures.

Moreover, the two coupling portions of the DC blocking unit are respectively and integrally connected to the feeding segment and the coupling segment, so that the first conductor can be formed by using a semiconductor process. That is to say, the first conductor can be formed without installing an independent electronic component (e.g., a capacitor) which may affect a radiation effect of the antenna structure, and the production cost of the antenna structure can be reduced.

In addition, the first expanding electrode segment and/or the second expanding electrode segment of the present disclosure can be used to effectively expand the area of the capacitance electrode of the P-sensor, thereby promoting the operating performance of the P-sensor.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A proximity sensor antenna device, comprising:
an antenna structure, comprising:
a first conductor having a feeding segment for connecting to a signal feeding cable, a coupling segment spaced apart from the feeding segment, and a direct current (DC) blocking unit connected between the feeding segment and the coupling segment;
a high-frequency blocking unit connected to the coupling segment of the first conductor; and
a second conductor spaced apart from the first conductor, wherein an end of the second conductor is connected to a ground, and the second conductor is provided without connecting any capacitance member and any inductance member;
wherein the coupling segment of the first conductor is selectively in a coupling antenna mode and in a capacitance electrode mode; when the coupling segment is in the coupling antenna mode, the coupling segment is configured to couple with the second conductor through a radiofrequency signal; when the coupling segment is in the capacitance electrode mode, the coupling segment is configured to detect an external object, and a capacitance value between the coupling segment and the external object is variable according to a distance between the coupling segment and the external object; and
a proximity sensor electrically connected to the high-frequency blocking unit, wherein the proximity sensor is electrically connected to the coupling segment of the first conductor via the high-frequency blocking unit.

2. The proximity sensor antenna device as claimed in claim 1, wherein the antenna structure includes a first inductance unit and a first expanding electrode segment, one end of the first inductance unit is connected to the coupling segment, and the other end of the first inductance unit is connected to the first expanding electrode segment, so that the coupling segment and the first expanding electrode segment are configured to co-detect the external object when the coupling segment is in the capacitance electrode mode.

3. The proximity sensor antenna device as claimed in claim 2, wherein the antenna structure includes a second inductance unit and a second expanding electrode segment, one end of the second inductance unit is connected to the coupling segment, and the other end of the second inductance unit is connected to the second expanding electrode segment, so that the coupling segment, the first expanding electrode segment, and the second expanding electrode segment are configured to co-detect the external object when the coupling segment is in the capacitance electrode mode.

4. The proximity sensor antenna device as claimed in claim 3, wherein one of the first inductance member and the second inductance member is connected to an end of the coupling segment arranged away from the feeding segment.

5. The proximity sensor antenna device as claimed in claim 1, wherein the DC blocking unit includes two coupling portions spaced apart from each other, the two coupling portions are respectively and integrally connected to the feeding segment and the coupling segment, and the two coupling portions are configured to couple with each other to generate a capacitance effect.

6. An antenna structure of a proximity sensor antenna device, comprising:
   a first conductor having a feeding segment for connecting to a signal feeding cable, a coupling segment spaced apart from the feeding segment, and a direct current (DC) blocking unit connected between the feeding segment and the coupling segment;
   a high-frequency blocking unit connected to the coupling segment of the first conductor; and
   a second conductor spaced apart from the first conductor, wherein an end of the second conductor is connected to a ground, and the second conductor is provided without connecting any capacitance member and any inductance member;
   wherein the coupling segment of the first conductor is selectively in a coupling antenna mode and in a capacitance electrode mode; when the coupling segment is in the coupling antenna mode, the coupling segment is configured to couple with the second conductor through a radiofrequency signal; when the coupling segment is in the capacitance electrode mode, the coupling segment is configured to detect an external object, and a capacitance value between the coupling segment and the external object is variable according to a distance between the coupling segment and the external object.

7. The antenna structure of the proximity sensor antenna device as claimed in claim 6, further comprising a first inductance unit and a first expanding electrode segment, wherein one end of the first inductance unit is connected to the coupling segment, and the other end of the first inductance unit is connected to the first expanding electrode segment, so that the coupling segment and the first expanding electrode segment are configured to co-detect the external object when the coupling segment is in the capacitance electrode mode.

8. The antenna structure of the proximity sensor antenna device as claimed in claim 7, further comprising a second inductance unit and a second expanding electrode segment, wherein one end of the second inductance unit is connected to the coupling segment, and the other end of the second inductance unit is connected to the second expanding electrode segment, so that the coupling segment, the first expanding electrode segment, and the second expanding electrode segment are configured to co-detect the external object when the coupling segment is in the capacitance electrode mode.

9. The antenna structure of the proximity sensor antenna device as claimed in claim 8, wherein one of the first inductance member and the second inductance member is connected to an end of the coupling segment arranged away from the feeding segment.

10. The antenna structure of the proximity sensor antenna device as claimed in claim 6, wherein the DC blocking unit includes two coupling portions spaced apart from each other, the two coupling portions are respectively and integrally connected to the feeding segment and the coupling segment, and the two coupling portions are configured to couple with each other to generate a capacitance effect.

* * * * *